Aug. 15, 1950 C. W. FISCHER ET AL 2,518,674
REGULATOR
Filed March 18, 1946 3 Sheets-Sheet 1

INVENTORS.
Carl W. Fischer,
BY Erwin Saballus.

Aug. 15, 1950     C. W. FISCHER ET AL     2,518,674
REGULATOR
Filed March 18, 1946     3 Sheets-Sheet 2
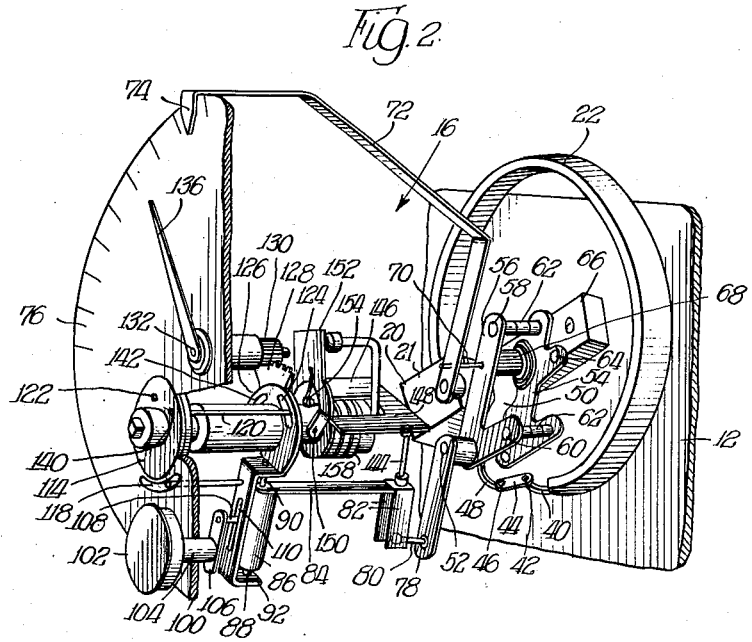
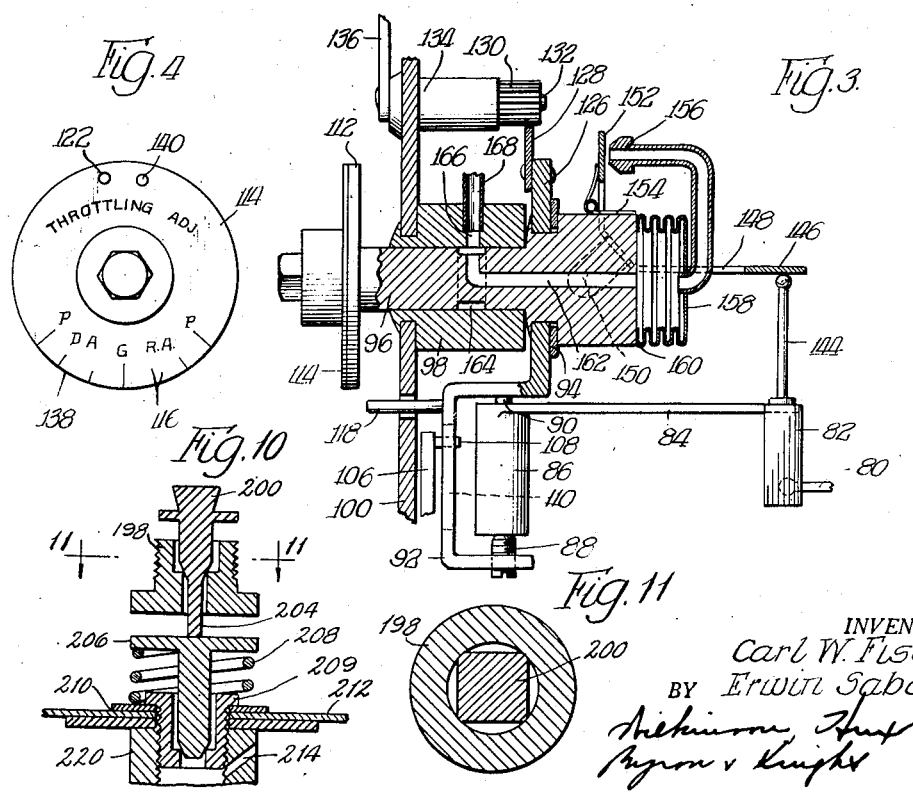
INVENTORS.
Carl W. Fischer,
BY Erwin Saballus, Aug. 15, 1950  C. W. FISCHER ET AL  2,518,674
REGULATOR
Filed March 18, 1946  3 Sheets-Sheet 3
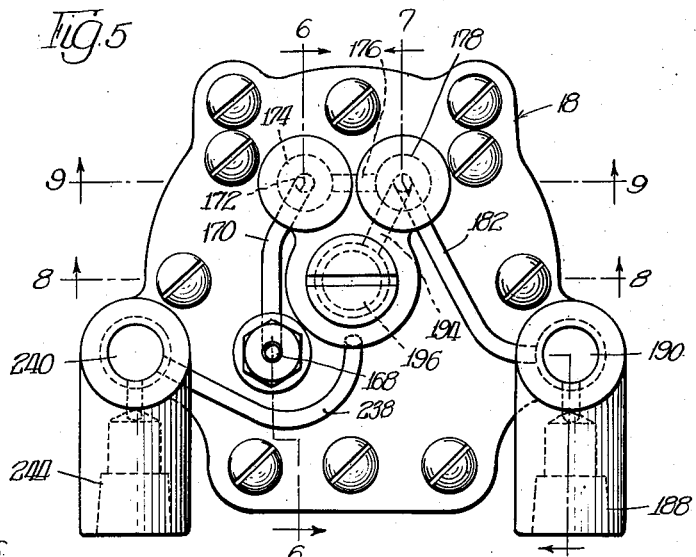
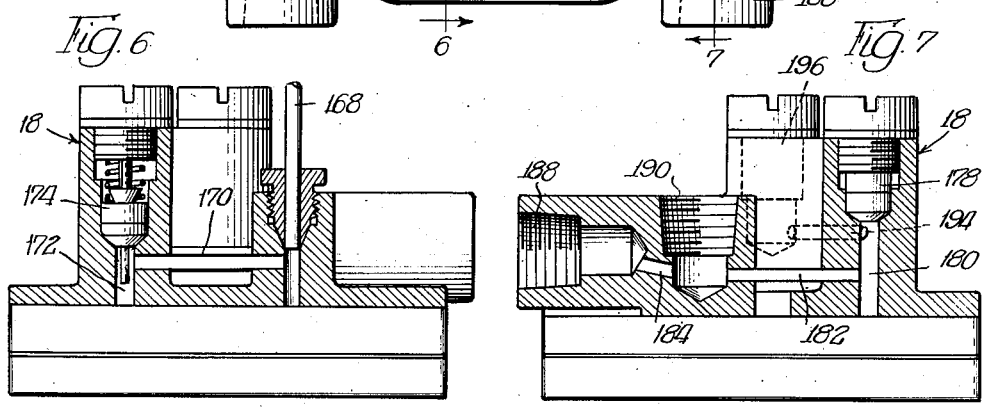
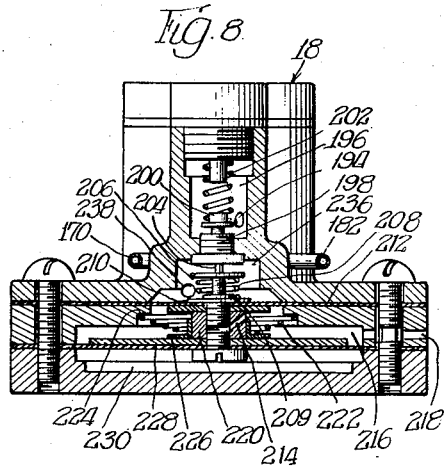
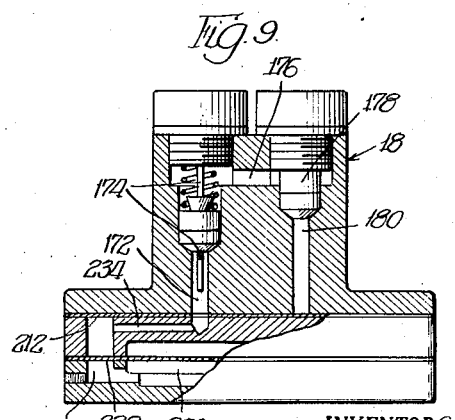
INVENTORS.
Carl W. Fischer,
BY Erwin Saballus,
ATTYS.

Patented Aug. 15, 1950

2,518,674

UNITED STATES PATENT OFFICE 2,518,674

REGULATOR

Carl W. Fischer and Erwin Saballus, Chicago, Ill., assignors to The Powers Regulator Company, Chicago, Ill., a corporation of Illinois Application March 18, 1946, Serial No. 655,312

22 Claims. (Cl. 137—153)

This invention pertains to regulating mechanism and more particularly, to a regulator for controlling either temperature or pressure.

In some installations it is desired to maintain a selected, substantially constant, temperature or pressure, and in order to do this it is desirable to accurately control a valve or the like so that the valve supplies a predetermined temperature or pressure therethrough. And it is desirable that the temperature or pressure at a predetermined point be maintained a steady constant with as little fluctuation as possible.

An object of the invention is to provide a regulating device of great sensitivity which can be set to more accurately control the condition to be maintained.

Another object of the invention is to provide regulating means to accurately control the conditions to be maintained, whereby there is means provided at the place where the conditions are to be maintained to properly proportion the variable at the place, such as the heating or cooling medium, or the pressure.

Another object of the invention is to provide a regulating device for controlling conditions to be maintained, such as temperature or pressure, the device itself being so constructed and arranged that it not only shows the selected temperature or pressure to be maintained, but also shows the temperature or pressure at any instant.

Another object of the invention is to provide a regulator for temperature or pressure which can be readily changed or set for direct or reverse acting control after installation or at the installation, without the necessity of structurally modifying any of the parts thereof.

Another object of the invention is to provide a regulator for controlling temperature or pressure which can be readily adjusted on the job for reverse or direct acting control.

Another object of the invention is to provide a regulator for controlling temperature or pressure conditions wherein the temperatuer or pressure control elements does not directly operate the control means for maintaining the conditions, but serves to pilot the control thereof, that is, a temperature or pressure sensitive element is utilized to control operating means which in turn causes actuation of the medium control device.

Another object of the invention is to provide a sensitive but relatively inexpensive control device wherein a commercially standard form of temperature or pressure sensitive means is utilized, such as a Bourdon tube gauge movement.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts:

Figure 2 is a fragmentary perspective elevation of the control mechanism of a control device embodying the invention;

Figure 3 is a fragmentary sectional elevational of a portion of the control mechanism illustrated in Figure 1, the same being taken substantially in a vertical plane through the axis of the control shaft for the flapper and nozzle assembly;

Figure 4 is an elevation of the throttling range dial for the control mechanism illustrated in Figures 1, 2 and 3;

Figure 5 is an enlarged plan view of the relay shown in Figure 1;

Figure 6 is a sectional elevation of the relay, the section being taken substantially in the plane as indicated by the line 6—6 of Figure 5;

Figure 7 is a sectional elevation of the relay, the section being taken substantially in the plane as indicated by line 7—7 of Figure 5;

Figure 8 is a sectional elevation of the relay, the section being taken substantially in the plane as indicated by the line 8—8 of Figure 5;

Figure 9 is a sectional elevation of the relay, the section being taken substantially in the plane as indicated by the line 9—9 of Figure 5;

Figure 10 is an enlarged fragmentary sectional elevation showing the supply and exhaust valves of the relay illustrated in Figure 8; and Figure 11 is an enlarged sectional plan view taken substantially in the plane as indicated by the line 11 of Figure 10.

Figure 1:
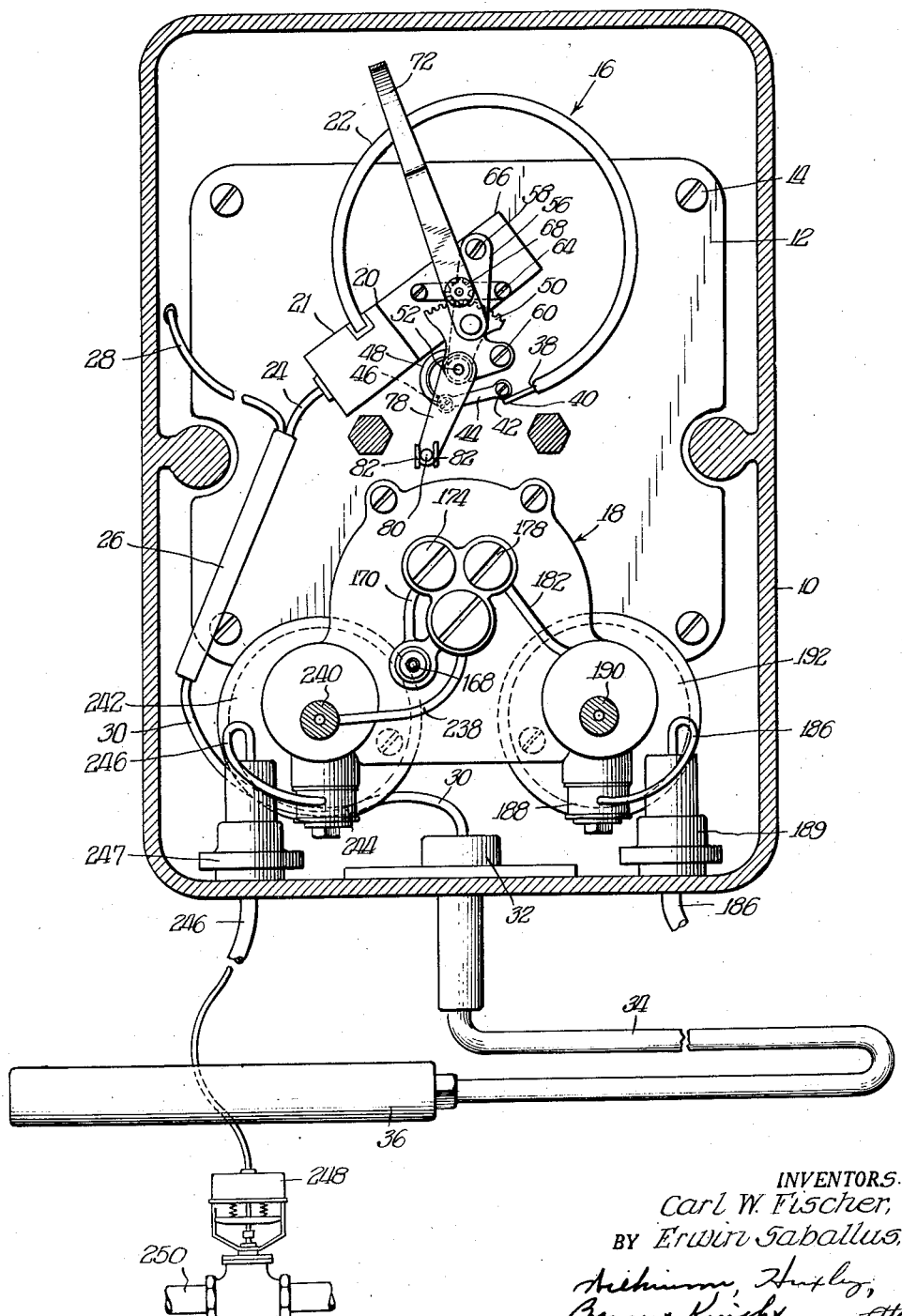
Figure 1 is a sectional elevation of the control device embodying the invention, with the dials removed, showing the connections between the control mechanism thereof and the relay or pilot mechanism.

The control device comprises the casing 10 in which the mounting plate is secured as at 14, said plate forming a convenient mounting for the control mechanism illustrated generally at 16, and the relay or pilot mechanism, indicated generally at 18. Mounting block 20 is supported on the plate 12 and is provided with a housing 21 which provides mounting means for the Bourdon tube 22, one end of which is secured to said block. The interior of the Bourdon tube communicates with the tube 24 through housing 21 and tube 24 is secured to the charging tube coupling 26 to which the charging tube 28 is secured. The coupling is also secured to the tube 30 which extends through the fitting 32 in the casing 10 and through the armoured cable 34 to the bulb 36.

Bulb 36 is used in the event that temperature is to be controlled, it being understood, of course, that if pressure is to be controlled, the bulb 36 is not used, the pressure being directly connected to the tube 30. It is to be noted that these controls (temperature and pressure) are similar because if pressure is used as a control medium directly, it directly acts on the Bourdon tube 22, whereas if a temperature control is used, the temperature at the bulb 36 affects the pressure in the capillary tube 30, communicating with the Bourdon tube 22. The charging tube 28 is used as a means to charge the Bourdon tube and tubes 24 and 30, and bulb 36 with the selected fluid to be used.

The end 38 of the Bourdon tube 22 is provided with a link 40 which is pivoted at 42 to the link 44, said link being pivoted at 46 to the arm 48 provided on the quadrant 50. Quadrant 50 is provided with shaft 52 fixed thereto and providing a pivot for said quadrant to the spaced bearing plates 54 and 56 secured together as at 58 and 60, suitable spacers 62 being disposed between the bearing plates. The lower bearing plate 54 is secured as at 64 to the arm 66 of mounting block 20, which in turn is carried by the mounting plate 12.

Quadrant 50 meshes with pinion 68 provided on the shaft 70, journalled in plates 54 and 56, the outer end of the shaft 70 being provided with temperature indicating pointer 72 which extends outwardly, being provided with the index 74 adapted to extend over the rim of the calibrated dial 76 adjacent the calibrations thereon.

Shaft 52 is provided with the crank 78 having the ball end crank arm 80 thereon which is adapted to be embraced by the spaced plates 82 depending from the lever arm 84. Lever arm 84 is provided with the bearing mounting 86 pivoted as at 88 and 90 to the bracket 92, pivot 88 being preferably adjustable. Bracket 92 is frictionally secured as at 94 to the throttling range control shaft 96. Shaft 96 is rotatably mounted in the bushing 98, said bushing being secured to the plate 100 which is fixed with respect to the plate 12 and provides a mounting for dial 76, and the axis of shaft 96 is in alignment with the axis of shaft 52.

A control setting knob 102 is provided with the shaft 104 journalled in plate 100 and is provided with the crank 106 having the crank pin 108 engaging in the slot 110 provided in bracket 92, whereby it will be seen that rotation of knob 102 rotates bracket 92 about the axis of shaft 96, and shaft 96 rotates with said bracket in its bushing 98.

Shaft 96 is provided with a fixed plate 112 on which the throttling range dial 114 is disposed, said dial being calibrated such as shown in Figure 4, where one part 116 (RA) of the dial 114 is used when the device is set for controlling reverse acting mechanism, the limit of movement being between G and P, meaning between gradual acting and positive acting, respectively. The portion 116 of the dial is read against the pointer 118 carried by the bracket 92.

When the portion 116 of the dial 114 is being used, a setting screw 120 will be inserted through aperture 140 of dial 114, being threaded into the member 112 and extending rearwardly, being received in a slot 124 provided in the quadrant portion 126 of bracket 92. The dial 114 can then be moved with respect to the quadrant portion 126 to the extent of the slot 124. Quadrant portion 126 is provided with the toothed quadrant 128 meshing with pinion 130 provided on shaft 132, the shaft being journalled as at 134 in the plate 100 and being provided with the pointer or index 136 movable over the face of dial 76 for showing the selected setting of the control mechanism, that is, at what temperature or pressure the device is set to maintain.

Dial 114 is also provided with the calibrated or dial portion 138 marked "DA" for controlling direct acting mechanism, being calibrated between the limits of G and P which indicate gradual acting or positive acting. As before, in order for the dial portion 138 to be operative to be read against the pointer 118, aperture 122 is provided in dial 114 for the reception of pin 120, pin 120 being threaded into plate 112 and the end of said pin being received in the opposed slot 142 of the quadrant portion 126. The spacing between apertures 140 and 122 is substantially the same as the spacing between the top adjacent ends of slots 142 and 124.

The lever arm 84 is provided with the upstanding positioning arm or pin 144, the ball end of which is adapted to engage one arm 146 of the flapper 148. Flapper 148 is pivoted as at 150 to the shaft 96 and is provided with the valve arm 152 which is urged in a clockwise direction as viewed in Figures 2 and 3 by means of the spring 154, whereby the arm 152 forms a valve with the nozzle 156. Nozzle 156 is carried by the flexible bellows 158 sealed at the end carrying the nozzle 156 and fixedly secured as at 160 to the shaft 96.

The bellows 158 acts to reduce the effect of fluctuations in supply pressure or other pressure disturbances that may be caused by mechanical vibration, by moving in such a direction as to restrict the pressure fluctuation.

The bellows 158 also serves to give more gradual action of the control valve 248 for a given change in temperature, due to the fact that bellows movement results in a smaller change in distance between the nozzle and the flapper for a given temperature change. The inside of the bellows is in communication with the passage 162 which extends axially of the shaft 96 and communicates with the circumferential passage 164.

Passage 164 communicates with passage 166 which in turn is connected through tube 168 (Figures 1, 5 and 6) to passage 170 of relay 18. Passage 170 communicates with passage 172 (Figures 5, 6 and 9), communicating with the restriction tube 174. The restriction tube 174 is connected through passage 176 (Figures 5 and 9), through filter 178, passages 180, 182 and 184 to the supply line 186 (Figure 1) through fitting 188, a fitting 189 being provided for line 186 where it passes through casing 10. Between passage 182 and passage 184 there is a pressure gauge mounting 190 to which the pressure gauge 192 is connected, which gauge indicates the supply pressure. This indicator is provided with the usual calibrated dial and indicating means, such as a hand or pointer, whereby the amount of the supply pressure can be readily read.

Passage 180 is connected through passage 194 (Figures 5, 7 and 8) to the supply valve chamber 196, said supply valve chamber being provided with the valve seat 198 for the supply valve 200, said supply valve having a stem providing clearance therearound (Figure 11) and being urged toward closed position by means of the spring 202. The supply valve 200 is provided with a valve stem 204 also providing clearance therearound which stem is adapted to engage a portion of the exhaust valve 206 having a stem providing clearance therearound and, said valve 206 being urged toward open position by means of the spring 208.

The exhaust valve 206 is adapted to seat on a seat 209 provided in member 210 carried by the high pressure diaphragm 212, passage of fluid past the seat flowing through passage 214 to the cavity 216 where it is exhausted to the atmosphere through a passage 218. Passage 214 is provided in the assembly 220, a spring 222 being disposed between the spring seat 224, provided in the housing of the relay, and the spring seat 226 provided on the low pressure diaphragm 228. The low pressure cavity 230 below the low pressure diaphragm 228 is connected through passage 232 (Figure 9) and passage 234 with passage 172 (Figures 6 and 9).

Cavity 236 in which the exhaust valve is disposed is connected through passage 238 (Figures 5 and 8) to the fitting 240 to which the control pressure indicator 242 is connected, said indicator being provided with a suitable calibrated dial or indicating means, such as a hand or pointer for showing the amount of exhaust pressure. Fitting 240 is connected through fitting 244, and tube 246 to a suitable control, such as a motor for a valve or the like whereby control pressure is supplied thereto, a suitable fitting 247 being povided for tube 246 where it passes through casing 10. A motorized valve such as above referred to, as well as a relay similar to the above described relay, is shown and described in Patent No. 2,331,799, granted October 12, 1943, the motorized valve being indicated generally at 248 in Figure 1, the valve controlling the passage of heat or pressure through line 250.

Assuming that the control device is to be set to operate a reverse acting control, such as a motor for operating a valve, the pin 120 (Figure 2) would be inserted through opening 140 of dial 114 (Figures 2 and 4), and the end of said pin would be engaged in slot 124. By reverse acting motor is meant one in which the valve opens with increase in air pressure. Also assume that it is desired to set the control mechanism at some predetermined temperature; knob 102 is rotated causing an oscillatory movement of the bracket 92 about shaft 96, which causes the quadrant 128 to move the index 136 across the dial 76 to the selected temperature. The bulb 36 is disposed to be subjected to the temperature of the medium controlled by a valve 248, for example, which in turn is controlled by a reverse acting motor.

Assuming that the medium, the temperature of which is to be controlled, is at room temperature, and assuming that the pointer 136 has been moved to a selected temperature on the dial 76 above that of room temperature, for example 150°, as the pointer 136 is moved toward 150°, rotation of the shaft 96 causes a bodily rotation of the flapper 148 around the axis of the shaft 96, which causes the arm 146 of the flapper to move over the end of the positioning arm 144. Movement of the arm 146 over the arm 144 causes said arm 146 to move with respect to its pivot 150 to permit spring 154 to move the upstanding arm 152 toward the nozzle 156, thereby restricting the flow from said nozzle.

Supply pressure will enter through tube 186, fitting 188, passage 184, and will operate indicator 192, indicating the amount of supply pressure. It will then flow through passage 182, filter 178, restriction tube 174, passages 172, 234 and 232 to the cavity 230 of low pressure diaphragm 228. Movement of the low pressure diaphragm will close the exhaust valve 206 and then will open the supply pressure valve 200 permitting pressure from the source of supply to flow past said supply valve through passage 238, registering on control pressure indicator 242 and will flow through fitting 244 and tube 246 to the motor of the reverse acting valve 248.

The pressure supplied to the motor will open wide the reverse acting valve permitting full flow of the heating medium through the valve 248 and pipe 250. As the medium, the temperature of which is to be controlled, increases in temperature it will, of course, heat the bulb 36 causing an expansion of the fluid in the bulb and the connection 34, whereby pressure is transmitted through tube 30, tube 24, housing 21 to the Bourdon tube 22. Increase of pressure in the Bourdon tube will cause the pointer 72 to move clockwise (Figure 2) toward the index 136. The pointer 72 moves clockwise in accordance with rotation of the pinion 68 by the quadrant 50, which is moved by the Bourdon tube.

Quadrant 50 is provided on shaft 52 and, consequently, lever 78 moves in a counterclockwise direction when the quadrant moves counterclockwise, causing pin 80 to move arm 84 about its axis 90—88, which in turn causes pin 144 to move the flapper 148 by movement of the arm 144 against arm 146. As pointer 74 approaches pointer 136, arm 152 of the flapper 148 will be moved away from the nozzle 156 reducing the pressure in bellows 158, passage 162, and tube 168 connected to the low pressure cavity below the low pressure diaphragm 228.

The supply valve 200 in the relay 18 will remain closed while the exhaust valve 206 will be caused to open by the reduction in pressure to the low pressure diaphragm 228, which in turn will reduce the pressure to the motor of the reverse acting valve 248, thereby causing said valve to move toward closed position, reducing the amount of heating medium supplied to the medium to be controlled.

As the pointer 74 more closely approaches the pointer 136 the flapper valve 148—156 opens more and more, causing a reduction in pressure to the motor of the reverse acting valve 248, thereby causing the reverse acting valve to move more and more toward closed position, thereby more and more reducing the heating medium supplied to the medium to be controlled.

In actual practice the heating medium will be reduced to a point where, actually, the temperature of the heating medium to be controlled, is reduced below the selected temperature (as indicated by the pointer 136), whereupon the bulb 36 will be affected to cause a reduction of pressure in the Bourdon tube 22 moving it so that the pointer 72 will move below the pointer 136. Thus the lever 78 will be moved in a clockwise direction to cause movement of the lever 84, and consequently, the positioning arm 144 to move the arm 152 of the flapper toward closed position with respect to the nozzle 156, which in turn will permit the pressure supplied through pipe 186 to operate the relay to supply an increase of pressure to the reverse acting valve 248 which will open the reverse acting valve permitting an increase of supply of the heating medium to the medium to be controlled.

If the throttling range dial 114 is not set properly for the local condition of the process being controlled, there will not be the closest control of the medium being controlled. If the throttling range dial 114 is set too close to Positive (P) with respect to the pointer 118, there will be a fluctuation of supply of the heating medium which will cause too great an oscillation of the temperature indicator pointer 72, that is, will cause a hunting action so that it will be necessary to set the dial 114 with respect to the pointer 118 to reduce this action. If the throttling range dial 114 is set too close to Gradual (G) with respect to the pointer 118, there will be a tendency of the medium being controlled to drift away from the selected setting. In case it is found that initially the dial 114 is set too close to Positive, the dial 114 is rotated so that the Positive (P) setting is moved away from the pointer 118, which rotates the shaft 96 causing movement of the arm 146 to change the angular relation between the arm 146 and path of movement of the positioning arm 144 so that the amount of movement of the flapper arm 152 is determined for a given movement of arm 144, the latter movement being directly related to the medium being controlled. Rotation of the shaft 96 rotates the flapper 148 with the shaft, thus placing the arm 146 of the flapper in a position where movement of the flapper is diminished for any movement of the flapper positioning arm 144.

Where the control device is to be used with a direct acting motorized valve, similar to valve 248, that is, one in which the valve closes with an increase in air pressure, pin 120 is backed out of slot 124, is removed from hole 140 and is inserted in hole 122 and disposed to engage in slot 142. Rotation of the dial 114 to effect the setting to direct acting causes rotation of the shaft 96 and consequently the flapper valve 148—156. This, then, causes an exact opposite control of the relay to that described for reverse acting which in turn causes an opposite control of the motor of the direct acting valve. The adjusting and control of the device is then similar to that described for the reverse acting valve.

It is to be understood that this application is not to be limited by the exact embodiments of the device shown, which are merely by way of illustration and not limitation as various and other forms of the device will, of course, be apparent to those skilled in the art without departing from the spirit of the invention or the scope of the claims.

We claim:

1. In control mechanism, the combination of a rotatably mounted throttling range control shaft, a dial fixedly mounted on one end of said shaft, a flexible bellows mounted on the other end of said shaft and having a nozzle therefrom, a flapper pivoted to said shaft and having angularly disposed arms, one of said arms being a valve arm for controlling flow from said nozzle, means associated with said flapper for urging said valve arm to close said nozzle, means supplying pressure to said bellows, a bracket member frictionally mounted on said shaft and having a pointer disposed adjacent said dial to be read in conjunction with said dial, said bracket being operatively connected to a pointer settable by movement of the bracket, a second dial for said last named pointer, rotatable means for setting said bracket, a lever arm pivoted to said bracket and extending in a direction parallel to the axis of said shaft, said lever arm having a flapper positioning arm adapted to engage the other arm of the flapper to thereby position said valve arm with respect to said nozzle, a pointer movable over the second dial, pressure responsive means for moving said last named pointer, and a flexible connection between said last named means and said lever arm.

2. In control mechanism, the combination of a rotatably mounted throttling range control shaft, a dial fixedly mounted on one end of said shaft, a nozzle provided at the other end of said shaft and rotatable therewith, a flapper pivoted to said shaft and having angularly disposed arms, one of said arms being a valve arm for controlling flow from said nozzle, means associated with said flapper for urging said valve arm to close said nozzle, means supplying pressure to said nozzle, a bracket member frictionally mounted on said shaft and having a pointer disposed adjacent said dial to be read in conjunction with said dial, said bracket being operatively connected to a pointer settable by movement of the bracket, a second dial for said last named pointer, rotatable means for setting said bracket, a lever arm pivoted to said bracket and extending in a direction parallel to the axis of said shaft, said lever arm having a flapper positioning arm adapted to engage the other arm of the flapper to thereby position said valve arm with respect to said nozzle, a pointer movable over the second dial, pressure responsive means for moving said last named pointer, and a flexible connection between said last named means and said lever arm.

3. In control mechanism, the combination of a rotatably mounted throttling range control shaft, a dial fixedly mounted on one end of said shaft, a nozzle provided at the other end of said shaft, a flapper pivoted to said shaft and having angularly disposed arms, one of said arms being a valve arm for controlling flow from said nozzle, means associated with said flapper for urging said valve arm to close said nozzle, means supplying pressure to said nozzle, a flapper positioning arm for affecting the relation between said flapper and nozzle, said flapper positioning arm being controlled by said rotatable means, a pointer movable over the second dial, pressure responsive means for moving said last named pointer, and a flexible connection between said last named means and said flapper positioning arm.

4. In control mechanism, the combination of a rotatably mounted throttling range control shaft, a dial fixedly mounted on one end of said shaft, a flexible bellows mounted on the other end of said shaft and having a nozzle therefrom, a flapper pivoted to said shaft and having angularly disposed arms, one of said arms being a valve arm for controlling flow from said nozzle, means associated with said flapper for urging said valve arm to close said nozzle, means supplying pressure to said nozzle, a flapper positioning arm for affecting the relation between said flapper and nozzle, said flapper positioning arm being controlled by said rotatable means, a pointer movable over the second dial, pressure responsive means for moving said last named pointer, and a flexible connection between said last named means and said flapper positioning arm.

5. In control mechanism, the combination of a rotatably mounted throttling range control shaft, a dial fixedly mounted on one end of said shaft, a nozzle provided at the other end of said shaft and rotatable therewith, a flapper pivoted to said shaft and having angularly disposed arms, one of said arms being a valve arm for controlling flow from said nozzle, means associated with said flapper for urging said valve arm to close said nozzle, means supplying pressure to said nozzle, a flapper positioning arm for affecting the relation between said flapper and nozzle, said flapper positioning arm being controlled by said rotatable means, a pointer movable over the second dial, pressure responsive means for moving said last named pointer, and a flexible connection between said last named means and said flapper positioning arm.

6. In control mechanism, the combination of a rotatably mounted throttling range control shaft, a dial fixedly mounted on one end of said shaft, a nozzle provided at the other end of said shaft, a flapper pivoted to said shaft and having angularly disposed arms, one of said arms being a valve arm for controlling flow from said nozzle, means associated with said flapper for urging said valve arm to close said nozzle, means supplying pressure to said nozzle, means associated with said shaft settable with respect to said dial and being adapted to affect the relation between said flapper and nozzle, a second dial, a pointer settable with respect to said second dial by said last named means, a pointer movable over the second dial, pressure responsive means for moving said last named pointer, and a flexible connection between said last named means and said third named means.

7. In control mechanism, the combination of a rotatably mounted throttling range control shaft, a dial fixedly mounted on one end of said shaft, a nozzle provided at the other end of said shaft and rotatable therewith, a flapper pivoted to said shaft and having angularly disposed arms, one of said arms being a valve arm for controlling flow from said nozzle, means associated with said flapper for urging said valve arm to close said nozzle, means supplying pressure to said nozzle, means associated with said shaft settable with respect to said dial and being adapted to affect the relation between said flapper and nozzle, a second dial, a pointer settable with respect to said second dial by said last named means, a pointer movable over the second dial, pressure responsive means for moving said last named pointer, and a flexible connection between said last named means and said third named means.

8. In control mechanism, the combination of a rotatably mounted throttling range control shaft, a dial fixedly mounted on one end of said shaft, a flexible bellows mounted on the other end of said shaft and having a nozzle therefrom, a flapper pivoted to said shaft and having angularly disposed arms, one of said arms being a valve arm for controlling flow from said nozzle, means associated with said flapper for urging said valve arm to close said nozzle, means supplying pressure to said bellows, means associated with said shaft settable with respect to said dial and being adapted to affect the relation between said flapper and nozzle, a second dial, a pointer settable with respect to said second dial by said last named means, a pointer movable over the second dial, pressure responsive means for moving said last named pointer, and a flexible connection between said last named means and said third named means.

9. In control mechanism, the combination of a rotatably mounted throttling range control shaft, a flexible bellows movable with said shaft, a nozzle movable by said bellows, a flapper movable by said shaft, resilient means urging said flapper toward said nozzle, means for adjusting said flapper with respect to said nozzle, and pressure responsive means for controlling movement of said flapper with respect to said nozzle.

10. In control mechanism, the combination of a rotatably mounted throttling range control shaft, a nozzle movable by said shaft, a flapper movable by said shaft, resilient means urging said flapper toward said nozzle, means for adjusting said flapper with respect to said nozzle, and pressure responsive means for controlling movement of said flapper with respect to said nozzle.

11. In control mechanism, the combination of a rotatably mounted throttling range control shaft, a nozzle movable by said shaft in a plane substantially normal to the axis of said shaft, a flapper pivoted on an axis normal to the axis of said shaft and movable toward said nozzle, and means movable about an axis at an angle to the axis of the flapper pivot for adjusting said flapper with respect to said nozzle.

12. In control mechanism, the combination of a rotatably mounted throttling range control shaft, a nozzle movable by said shaft in a plane substantially normal to the axis of said shaft, a flapper pivoted on an axis normal to the axis of said shaft and movable toward said nozzle, means movable about an axis at an angle to the axis of the flapper pivot for adjusting said flapper with respect to said nozzle, and pressure responsive means for controlling relative movements between said nozzle and flapper.

13. In control mechanism, the combination of a rotatably mounted throttling range control shaft, a flexible bellows mounted on one end of said shaft and rotatable with said shaft, said bellows being extensible axially of said shaft, a nozzle provided on said bellows and rotatable with said shaft, a flapper pivoted on an axis normal to the axis of said shaft and movable toward said nozzle, and means movable about an axis at an angle to the axis of the flapper pivot for adjusting said flapper with respect to said nozzle.

14. In control mechanism, the combination of a rotatably mounted throttling range control shaft, a flexible bellows mounted on one end of said shaft and rotatable with said shaft, said bellows being extensible axially of said shaft, a nozzle provided on said bellows and rotatable with said shaft, a flapper pivoted on an axis normal to the axis of said shaft and movable toward said nozzle, means movable about an axis at an angle to the axis of the flapper pivot for adjusting said flapper with respect to said nozzle, and pressure responsive means for controlling relative movements between said nozzle and flapper.

15. In control mechanism, the combination of a rotatably mounted throttling range control shaft, a flexible bellows movable with said shaft, a nozzle movable by said bellows, a flapper pivoted to said shaft, means resiliently urging said flapper toward said nozzle, means for adjusting said flapper with respect to said nozzle, and pressure responsive means for controlling movement of said flapper with respect to said nozzle.

16. In control mechanism, the combination of a rotatably mounted throttling range control shaft, a flexible bellows provided on said shaft extensible in directions axially of said shaft, said shaft having a passage communicating with said bellows for supplying actuating fluid thereto, a nozzle provided on said bellows bodily movable therewith and thereby, a flapper pivotally mounted on said shaft, resilient means urging said flapper toward said nozzle for regulating flow of actuating fluid from said bellows, a bracket frictionally pivoted on said shaft, an arm pivoted to said bracket, the pivot between said arm and bracket being substantially normal to the axis of the shaft, a positioning pin provided on said arm engaging said flapper for adjusting said flapper with respect to said nozzle, and control means movable to move said positioning pin about the pivot between said arm and bracket to thereby move said flapper with respect to said nozzle.

17. In control mechanism, the combination of a rotatably mounted throttling range control shaft, a nozzle movable by said shaft, a flapper pivotally mounted on said shaft, resilient means urging said flapper toward said nozzle, means for adjusting said flapper with respect to said nozzle, and pressure responsive means for controlling movement of said flapper with respect to said nozzle.

18. In control mechanism, the combination of a rotatably mounted throttling range control shaft, a flexible bellows movable with said shaft, said shaft having a passage communicating with said bellows for supplying actuating fluid thereto, a nozzle provided on said bellows bodily movable therewith and thereby, a pivotally mounted flapper, resilient means urging said flapper toward said nozzle for regulating flow of actuating fluid from said bellows, a positioning pin engaging said flapper and movable to adjust said flapper with respect to said nozzle, and control means movable to move said positioning pin to thereby move said flapper with respect to said nozzle.

19. In control mechanism, the combination of a rotatably mounted throttling range control shaft, a flexible bellows provided on said shaft extensible in directions axially of said shaft, said shaft having a passage communicating with said bellows for supplying actuating fluid thereto, a nozzle provided on said bellows bodily movable therewith and thereby, a flapper pivotally mounted on said shaft, resilient means urging said flapper toward said nozzle for regulating flow of actuating fluid from said bellows, a bracket movable with said shaft and movable with respect thereto, an arm pivoted to said bracket, a positioning pin provided on said arm engaging said flapper for adjusting said flapper with respect to said nozzle, and control means movable to move said positioning pin about the pivot between said arm and bracket to thereby move said flapper with respect to said nozzle.

20. In control mechanism, the combination of a rotatably mounted throttling range control shaft, a nozzle provided on said shaft movable with respect thereto, said shaft having a passage communicating with said nozzle for supplying actuating fluid thereto, a flapper pivotally mounted on said shaft, resilient means urging said flapper toward said nozzle for regulating flow of actuating fluid from said nozzle, a bracket frictionally pivoted on said shaft, an arm pivoted to said bracket, the pivot between said arm and bracket being substantially normal to the axis of the shaft, a positioning pin provided on said arm engaging said flapper for adjusting said flapper with respect to said nozzle, and control means movable to move said positioning pin about the pivot between said arm and bracket to thereby move said flapper with respect to said nozzle.

21. In control mechanism, the combination of a rotatably mounted throttling range control shaft, a nozzle provided on said shaft movable with respect thereto, said shaft having a passage communicating with said nozzle for supplying actuating fluid thereto, a flapper pivotally mounted on said shaft, resilient means urging said flapper toward said nozzle for regulating flow of actuating fluid from said nozzle, a positioning pin engaging said flapper and movable to adjust said flapper with respect to said nozzle, and control means movable to move said positioning pin to thereby move said flapper with respect to said nozzle.

22. In control mechanism, the combination of a rotatably mounted throttling range control shaft, a nozzle provided on said shaft movable with respect thereto, said shaft having a passage communicating with said nozzle for supplying actuating fluid thereto, a flapper pivotally mounted on said shaft, resilient means urging said flapper toward said nozzle for regulating flow of actuating fluid from said nozzle, a bracket movable with said shaft and movable with respect thereto, an arm pivoted to said bracket, a positioning pin provided on said arm engaging said flapper for adjusting said flapper with respect to said nozzle, and control means movable to move said positioning pin about the pivot between said arm and bracket to thereby move said flapper with respect to said nozzle.

CARL WM. FISCHER.
ERWIN SABALLUS.

REFERENCES CITED

The following references are of record in the file of this patent:

UNITED STATES PATENTS

| Number | Name | Date |
|---|---|---|
| Re. 20,092 | Mason | Sept. 1, 1936 |
| 2,117,800 | Harrison | May 17, 1938 |
| 2,366,246 | Erbguth | Jan. 2, 1945 |
| 2,427,235 | Smoot | Sept. 9, 1947 |